United States Patent
Srb-Gaffron et al.

(10) Patent No.: US 9,850,098 B2
(45) Date of Patent: Dec. 26, 2017

(54) POLYGON COMPENSATION COUPLING SYSTEM FOR CHAIN AND SPROCKET DRIVEN SYSTEMS

(71) Applicant: OTIS ELEVATOR COMPANY, Farmington, CT (US)

(72) Inventors: Walter Srb-Gaffron, Baden (AT); Alexander Turek, Vienna (AT); Philipp Schedl, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 90 days.

(21) Appl. No.: 14/774,759

(22) PCT Filed: Mar. 15, 2013

(86) PCT No.: PCT/IB2013/052091
§ 371 (c)(1),
(2) Date: Sep. 11, 2015

(87) PCT Pub. No.: WO2014/140696
PCT Pub. Date: Sep. 18, 2014

(65) Prior Publication Data
US 2016/0031678 A1 Feb. 4, 2016

(51) Int. Cl.
*B66B 23/02* (2006.01)
*B66B 21/00* (2006.01)
(Continued)

(52) U.S. Cl.
CPC ............ *B66B 23/022* (2013.01); *F16H 7/06* (2013.01); *F16H 55/303* (2013.01)

(58) Field of Classification Search
None
See application file for complete search history.

(56) References Cited

U.S. PATENT DOCUMENTS 3,149,715 A * 9/1964 Massimiani ........... B65G 43/00
104/249
3,155,227 A * 11/1964 Wesson ................. B65G 21/22
198/834

(Continued)

FOREIGN PATENT DOCUMENTS

JP 2002114472 A 4/2002
WO 2012161691 A1 11/2012

OTHER PUBLICATIONS

International Search Report or Written Opinion for application PCT/IB2013/052091 dated Dec. 17, 2013, 11 pages.

*Primary Examiner* — Kavel Singh
(74) *Attorney, Agent, or Firm* — Cantor Colburn LLP

(57) ABSTRACT

A polygon compensation coupling system (30; 40; 60) comprises a first rotatable element (31; 41; 61), a second rotatable element (32; 42; 62a, 62b), and at least one linkage coupling the first rotatable element (31; 41; 61) with the second rotatable element (32; 42; 62a, 62b). The linkage comprises at least one first coupling element (34a; 44a; 64a) pivotably coupled to the first rotatable element (31; 41; 61) and at least one second coupling element (34b; 44b; 64b) pivotably coupled to the second rotatable element (32; 42; 62b). The first and second coupling elements (34a, 34b; 44a, 44b; 64a, 64b) are pivotably coupled to each other at a hinge point, the hinge point is configured to move along a compensation curve varying the coupling between the first rotatable element (34a; 44a; 64a) and the second rotatable element (32; 42; 62b).

23 Claims, 14 Drawing Sheets

(51) Int. Cl.
*F16H 7/06* (2006.01)
*F16H 55/30* (2006.01)

(56) References Cited

U.S. PATENT DOCUMENTS

| | | | | |
|---|---|---|---|---|
| 8,617,014 B2* | 12/2013 | Grobbel | ............... | B66B 23/022 |
| | | | | 474/136 |
| 9,599,201 B2* | 3/2017 | Srb-Gaffron | .......... | B66B 23/022 |
| 9,718,646 B2* | 8/2017 | Srb-Gaffron | .......... | B66B 23/022 |
| 2002/0142873 A1* | 10/2002 | Oser | ....................... | B66D 3/18 |
| | | | | 474/141 |
| 2005/0130780 A1 | 6/2005 | Carolina Korse | | |
| 2010/0255944 A1 | 10/2010 | Grobbel | | |

* cited by examiner

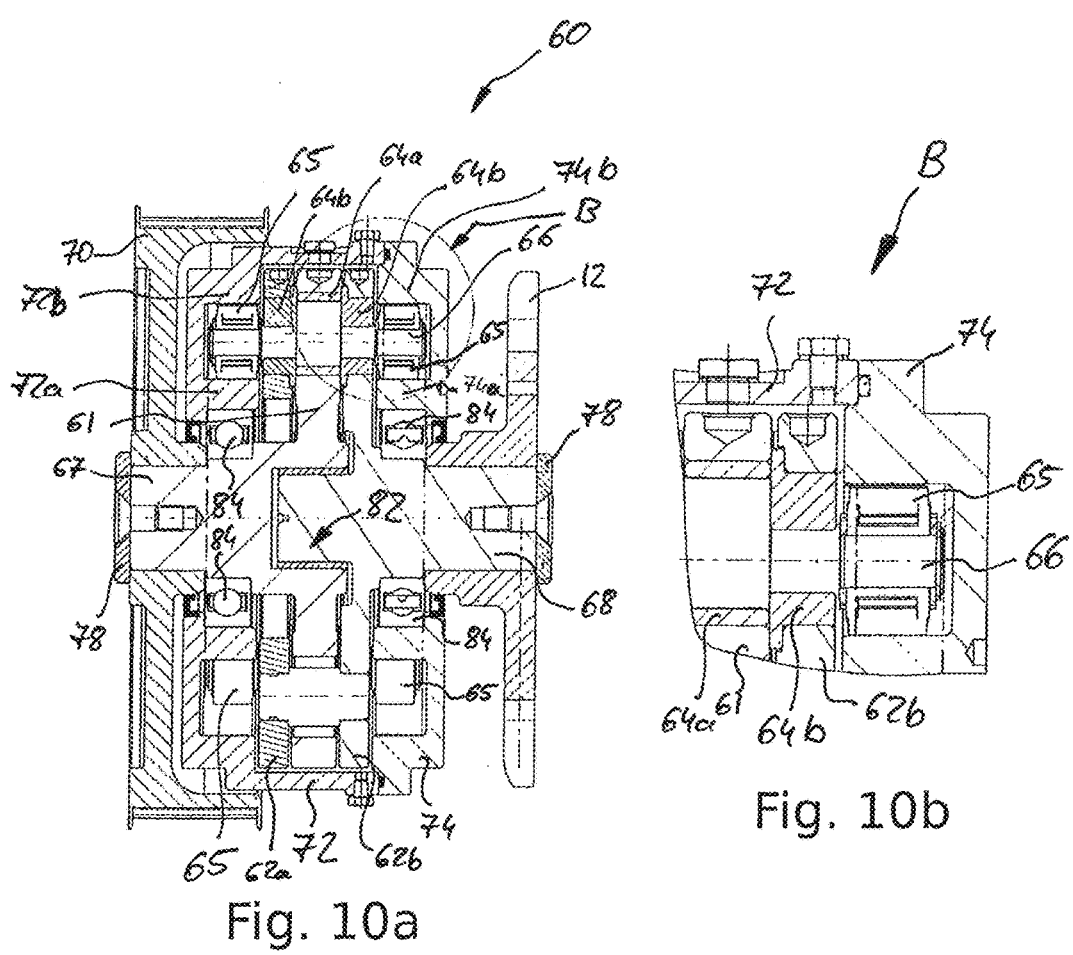

POLYGON COMPENSATION COUPLING SYSTEM FOR CHAIN AND SPROCKET DRIVEN SYSTEMS

FIELD OF THE DISCLOSURE

The present disclosure generally relates to chain and sprocket driven systems and, more particularly, relates to reducing a polygon effect associated with chain and sprocket driven systems, such as passenger conveyor systems.

BACKGROUND OF THE DISCLOSURE

Several types of passenger conveyor systems, such as, escalators, moving walkways, moving sidewalks, etc. are widely used these days to effectively transport pedestrian traffic or other objects from one location to another. Areas of usage of these passenger conveyor systems often include airports, hotels, shopping malls, museums, railway stations and other public buildings. Such passenger conveyor systems typically have two landings (e.g., a top landing and a bottom landing in case of an escalator) and a plurality of steps/treads traveling in a closed loop in between the landings. The closed loop forms a load track and a return track interconnected by first and second turnaround sections located at the landings. Passenger conveyors also include moving handrails traveling together with the steps/treads and a truss structure supporting the treads/steps and moving handrails. The steps/treads are driven by a step chain (also called an escalator chain). Typically, the step chain is driven by a step chain sprocket and travels in a closed loop forming a load track and a return track interconnected by first and second turnaround sections. In particular configurations of a passenger conveyor system a drive module having a motor and a main shaft drives one or more main drive chain sprockets. The main drive chain sprockets in turn drive the step chain sprocket which is engaged by the step chain. The step chain engages the treads/steps for moving the treads/steps around the endless loop.

The interaction of the step chain with the step chain sprocket often produces fluctuations and vibrations. By way of background, a step chain, like any other chain drive, includes a plurality of discrete chain links, called step chain links, connected together by way of connecting links, such as a pin and a link plate or a roller. A drive sprocket (e.g., the step chain sprocket) includes a profiled wheel having a plurality of engaging teeth for meshing and engaging the connecting links (or possibly even engaging the step chain links) of the step chain, in order to move the step chain as the step chain sprocket rotates. The engagement of the connecting links of the step chain with the engaging teeth of the step chain sprocket causes the step chain to vibrate and fluctuate. These vibrations and fluctuations are often called a polygon effect or a chordal action and not only affect the ride experience of a user (who typically feels these vibrations and fluctuations aboard the passenger conveyor system), but also cause undesirable friction between the step chain and the step chain sprocket, thereby reducing the service life time of those components. Noise generated by the vibrations resulting from the engagement of the step chain with the step chain sprocket is another concern.

Therefore, mitigating or compensating the polygon effect is desirable. Several solutions to reduce or otherwise mitigate the polygon effect have been proposed in the past. Generally, the intensity of polygon effect depends on the velocity of the step chain and the length of the chain links in relation to the diameter of the sprocket. The greater said relation and the higher the velocity of the step chain, the stronger the polygon effect. One possibility for reducing the polygon effect thus is to reduce the pitch of the step chain. In consequence, one approach of mitigating the polygon effect involves increasing the number of step chain links in the step chain (which can reduce the step chain pitch), and/or correspondingly increasing the diameter of the step chain sprocket(s) to increase the number of teeth in engagement with the sprocket (which may also effectively reduce the step chain pitch). This techniques, although effective in improving the riding experience of a user, nonetheless have several disadvantages.

For example, due to the increase in the number of the parts (e.g., increase in the number of step chain links and other associated parts, such as rollers, pins, bushings, link plates, etc., of the step chain, and/or a bigger sprocket), the overall cost of the associated system increases.

Furthermore, the efforts involved with the necessary maintenance of the increased number of components increases, and so does the amount of lubricant needed to reduce the increased wear and tear amongst those components. This increased wear and tear can additionally reduce the service life time of the step chain and the step chain sprocket. Moreover, the aforementioned approach does not address to the noise issue discussed above, and may in fact increase the noise due to a greater engagement of the step chain with the step chain sprocket.

U.S. Pat. No. 6,351,096 B1 and WO 01/42122 A1 disclose electronic drive systems configured to control a motor driving the sprocket of a chain drive to rotate with non constant velocity, the non-constant rotation of the sprocket compensating the polygon effect. This solutions results in a fluctuation of the velocity of the motor requiring a repeated acceleration and deceleration of the motor and all connected moving elements.

EP 1 479 640 B1 and U.S. Pat. No. 4,498,890 teach to compensate the polygon effect by providing a curved track section having a varying curvature in the straight portion of the chain next to the sprocket. Such curved track sections, however, reduce the usable length of the chain loop, as the portion of the loop in which the curved section is located cannot not be used for transportation.

WO 2012/161691 A1 discloses a polygon compensation coupling system for reducing a polygon effect in a chain driven system. The polygon compensation coupling system includes a chain sprocket and a main drive in engagement with the chain sprocket, such that the engagement defines a compensation curve to reduce the polygon effect.

Accordingly, it would be beneficial to provide an improved polygon compensation coupling system eliminating the drawbacks of the prior art and in particular increasing the transmittable torque and reducing the space requirements.

SUMMARY OF THE DISCLOSURE

A polygon compensation coupling system according to an exemplary embodiment of the invention comprises a first rotatable element, a second rotatable element and at least one linkage coupling the first rotatable element with the second rotatable element. The first and second rotatable elements may be arranged coaxially to each other. The linkage comprises at least one first coupling element pivotably coupled to the first rotatable element and at least one second coupling element pivotably coupled to the second rotatable element. The first and second coupling elements are pivotably coupled to each other at a hinge point, the hinge point being configured to move along a compensation curve varying the coupling between the first rotatable element and the second rotatable element.

Exemplary embodiments of the invention further include a chain drive comprising at least one polygon compensation coupling system according to an exemplary embodiment of the invention, and a conveyor system, in particular a people conveyor as e.g. an escalator or a moving walkway, comprising such a chain drive.

The polygon compensation coupling system according to exemplary embodiments of the invention provides a satisfying coupling between the drive, the sprocket and the chain, allowing to transfer large torques from a drive to the sprocket of a chain drive and at the same time compensate the polygon effect generated by the sprocket.

In the case of failure, a polygon compensation coupling system according to an exemplary embodiment will act as a simple coupling not including any compensating effect, thus enhancing safety.

In exemplary embodiments of the polygon compensation coupling system the input and output rotational elements may be arranged coaxially allowing an improved integration of the system.

BRIEF DESCRIPTION OF THE DRAWINGS

FIG. 10a shows a sectional view of the PCC according to the third embodiment.

FIG. 10b shows an enlarged portion of FIG. 10a.

DETAILED DESCRIPTION

Figure 1:
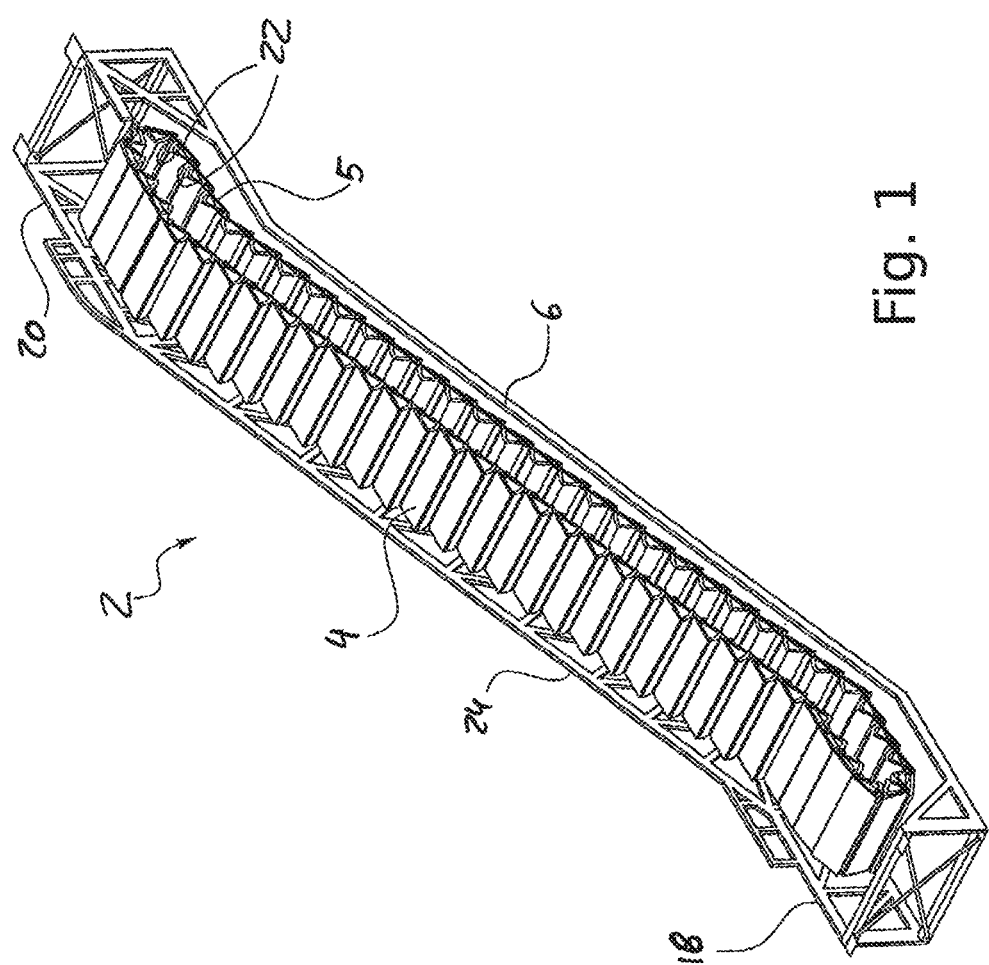
FIG. 1 shows an example of a passenger conveyor system, in which a polygon compensation coupling system according to exemplary embodiments of the present invention may be used.

An example of a passenger conveyor system 2, in which exemplary embodiments of the present invention may be used, is shown in FIG. 1. The passenger conveyor system 2 includes a bottom landing 18 connected to a top landing 20 via a plurality of steps (also referred to as treads) 4 and a truss 6. A step chain 5 having a plurality of step chain links 22 is engaged with the plurality of treads 4 in order to drive and guide those treads 4 in an endless loop between the top landing 20 and the bottom landing 18. The step chain 5 is driven by rotation of a step chain sprocket 12, which is not visible in FIG. 1. The passenger conveyor system 2 may further include a pair of moving handrails 24, only one of which is shown in FIG. 1.

Figure 2:
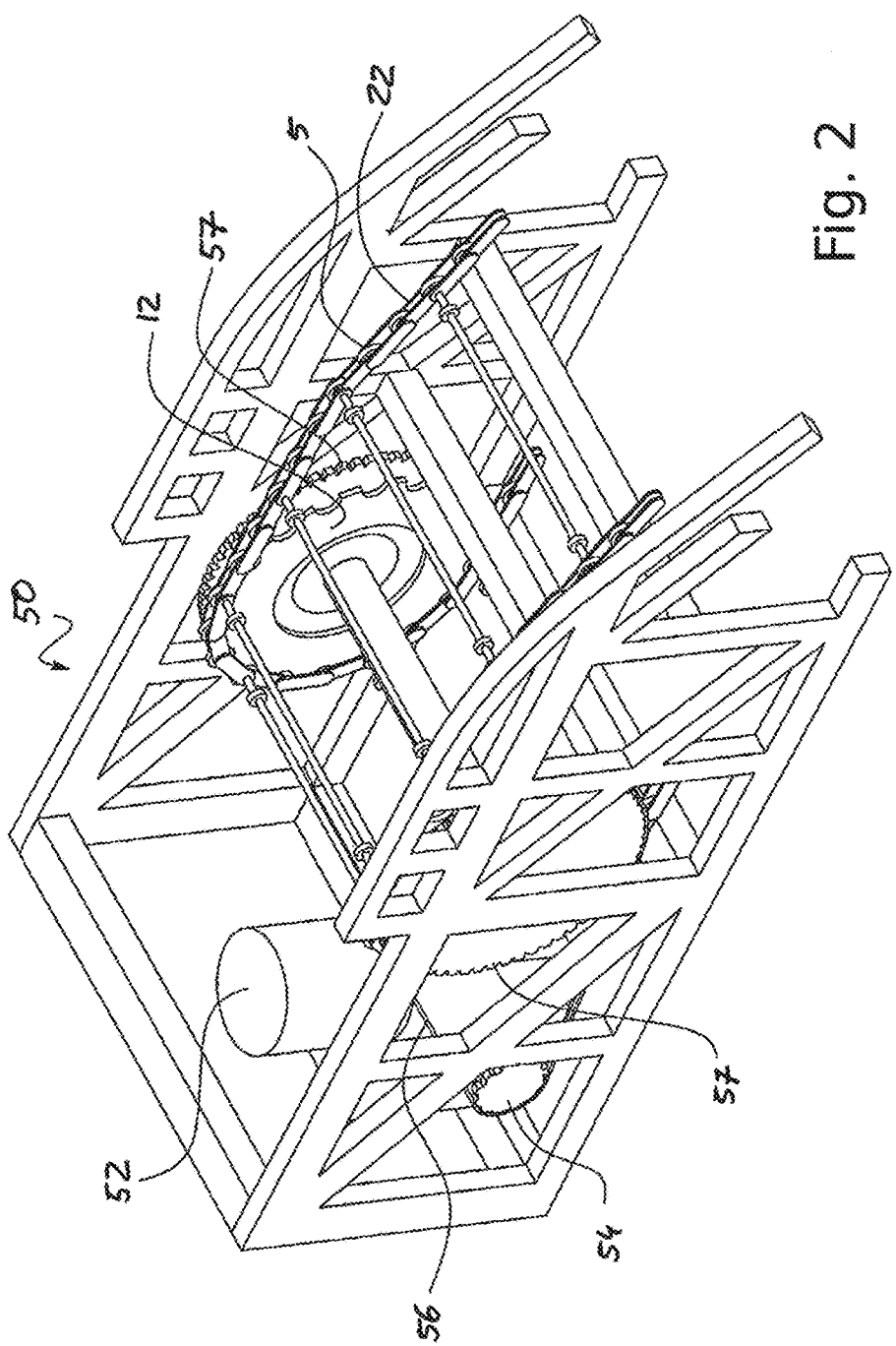
FIG. 2 shows an example of a drive module to be used in combination with a passenger conveyor system as it is shown in FIG. 1.

FIG. 2 shows an example of a drive module 50 to be used in a passenger conveyor system 2 as it is shown in FIG. 1. The drive module 50 may be provided beneath the top landing 20 and may include a motor 52, which may directly or indirectly drive a main drive shaft provided with a machine drive chain sprocket 54. The machine drive chain sprocket 54 in turn may drive a main drive chain 56 to which is engaged a main drive chain (MDC) sprocket 57. The main drive chain sprocket 57 may engage with, and rotate concurrently with, the step chain (STC) sprocket 12 which is configured to move the step chain 5. In other embodiments, the step chain (STC) sprocket 12 may be driven by the main drive shaft via a belt, cogged belt or via a gear train.

Notwithstanding the components of the passenger conveyor system 2 described above, it will be understood that several other components, such as, gearbox, brakes, etc., that are commonly employed in passenger conveyor systems are contemplated and considered within the scope of the present disclosure. It will also be understood that while several of the components, such as, the machine drive chain sprocket 54 and the main drive (MDC) sprocket 57 of the drive module 50 described above are driven by chains, in at least some embodiments, one or more of those components may be driven by belts or other commonly employed mechanisms. Furthermore, in at least some embodiments, the main drive shaft may directly drive (by way of belts, chains or gears) the MDC sprocket 57, without the usage of the machine drive chain sprocket 44 and the main drive chain 56. In yet other embodiments, the main drive shaft may directly drive (by belts, chains or gears) the STC sprocket 12 without the usage of the machine drive chain sprocket 54 or the MDC sprocket 57.

Figure 3:
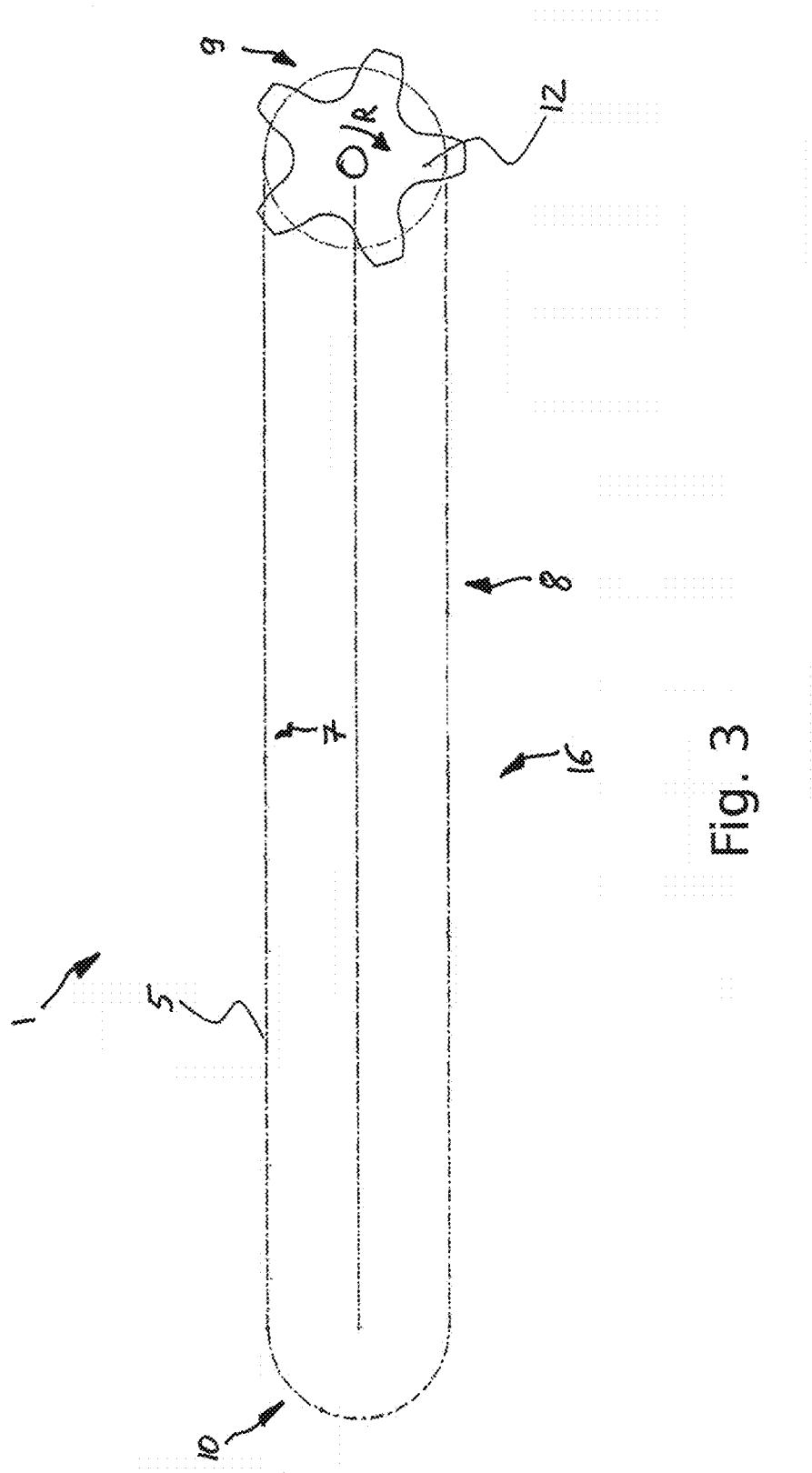
FIG. 3 shows a schematic view of a chain drive for driving a conveyor system as it is shown in FIG. 1.

FIG. 3 shows a schematic view of a chain drive 1. The chain drive 1 may be used in a conveyor system 2 as it is shown in FIG. 1. The chain drive 1 comprises a (step) chain 5 configured to rotate in a closed loop 16 forming a load track 7 and a return track 8 interconnected by first and second turnaround sections 9, 10, respectively. The turnaround sections 9, 10 are located at opposing ends of the loop 6. A step chain drive sprocket 12 which is configured for driving the chain 5 is arranged in the first turnaround section 9 shown on the right side of FIG. 3.

In the embodiment shown in FIG. 3, the step chain drive sprocket 12 will turn clockwise in normal operation, as indicated by arrow R. In consequence, in normal operation the chain 5 will travel from left to right in the upper load track 7 and from right to left in the lower return track 8.

In this embodiment the engagement of the step chain 5 with the step chain sprocket 12 takes place on the top of the step chain sprocket 12 in normal operation and at the lowest point of the step chain sprocket 12 when rotating in the opposite direction. A guiding trail may guide the step chain 5 towards the top point or bottom point of the step chain sprocket 12, respectively. If this can not be realized due to system constraints, the velocity difference function and the compensation curve described below will have a different shape due to the different geometrical relations. The principle of polygon compensation, however, will remain the same.

When the step chain drive sprocket 12 is driven with constant angular velocity, an undesirable polygon effect will occur due to the deflection of the chain 5 in the first and second turnaround sections 9, 10.

According to exemplary embodiments of the invention, a polygon compensation coupling system (PCC) is arranged between the motor 52 and the step chain drive sprocket 12, the PCC being configured to transform rotation of the motor 52 rotating with constant angular velocity, on the input side of the PCC, into rotation with non-constant angular velocity on the output side of the PCC. Transformation is effected such that the fluctuation of the speed of rotation of the step chain drive sprocket 12 will compensate the above mentioned polygon effect.

Figure 4:
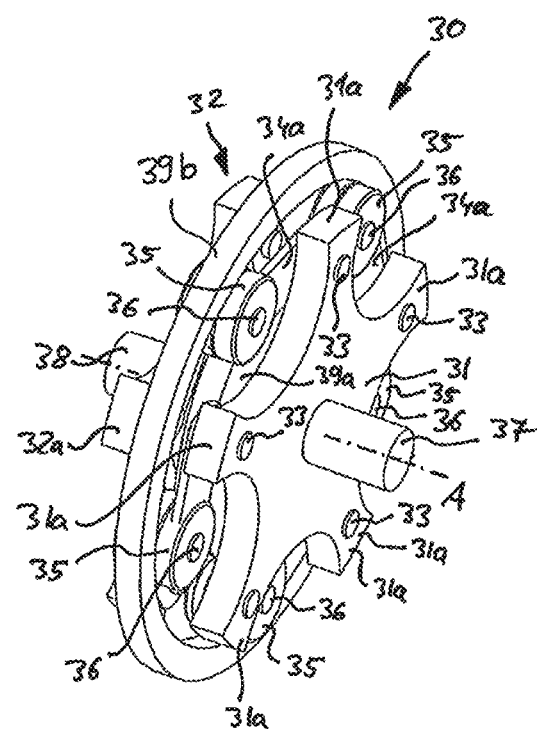
FIG. 4 shows a perspective view of a polygon compensation coupling system (PCC) according to a first exemplary embodiment of the invention.

FIG. 4 shows a perspective view of a polygon compensation coupling system (PCC) 30 according to a first exemplary embodiment of the invention.

The PCC 30 according to the first embodiment comprises a first rotatable element 31, which is shown on the right side of FIG. 4, coupled to a first shaft 37 extending to the right side and a second rotatable element 32, which is shown on the left side of FIG. 4, coupled to a second shaft 38 extending to the left side. The first and second rotatable elements 31, 32 as well as the associated first and second shafts 37, 38 are arranged coaxially to each other along a common center axis line A. The first and second shafts 37, 38 are separate and connected to each other only by means of the rotatable elements 31, 32 as will be explained in the following.

The first and second rotatable elements 31, 32 are formed as stars, respectively. Each of the first and second rotatable elements 31, 32 comprises five spikes or protrusions 31a, 32a, which are formed equidistantly at predetermined intervals along the circumferential periphery of the rotatable elements 31, 32. It is to be noted that the number of five protrusions 31a, 32a, as shown in FIG. 4, corresponds to the number of teeth of the step chain drive sprocket 12.

Coupling elements 34a formed as levers are pivotably connected the protrusions 31a, 32a by means of connecting bolts 33 extending in axial direction, i.e. parallel to the center axis line A, through each of the protrusions 31a, 32a.

Each of the coupling elements 34a connected to one of the protrusions 31a of the first rotatable element 31 is pivotably coupled to a corresponding coupling element, which is not visible in FIG. 4, connected to a protrusion 32a of the second rotatable element 32 by means of a joint comprising an axle 36 extending in axial direction trough the first and second coupling elements 34a. As a result, the first rotatable element 31 is coupled with the second rotatable element 32 by means of the coupling elements 34a, which are pivotably connected to each other by the axle 36. At least one roller 35 is rotatably mounted to each of said axles 36.

A disk shaped stationary element 39a, which is not rotatable, is arranged coaxially to the first and second rotatable elements 31, 32 in between said rotatable elements 31, 32 along the axial direction. The outer periphery of the stationary element 39a provides an inner race for the rollers 35. An outer race for the rollers 35 is formed by the inner periphery of a stationary outer ring 39b, which is not rotatable, as well, and which is arranged parallel to the stationary element 39a in a radial distance therefrom providing a circumferential space between the disk shaped element 39a and the outer ring 39b accommodating the rollers 35.

The radial distance between the outer periphery of the stationary element 39a and the inner periphery of the outer ring 39b is set to be slightly larger than the diameter of the rollers 35, therefore the rollers 35 will be in contact only with either the inner periphery of the stationary element 39a, when the rotatable elements 31, 32 rotate in a first direction or with the inner periphery of the outer ring 39b, when the rotatable elements 31, 32 rotate in a second, opposing direction.

In case the races provided by the peripheries of the stationary element 39a and the outer ring 39a would be formed as perfect circles, the link mechanism provided by the first and second coupling elements 34a would couple the first and second rotatable elements 31, 32 directly to each other so that they would rotate jointly with the same angular velocity when one of the shafts 37, 38 is rotatably driven.

Figure 5:
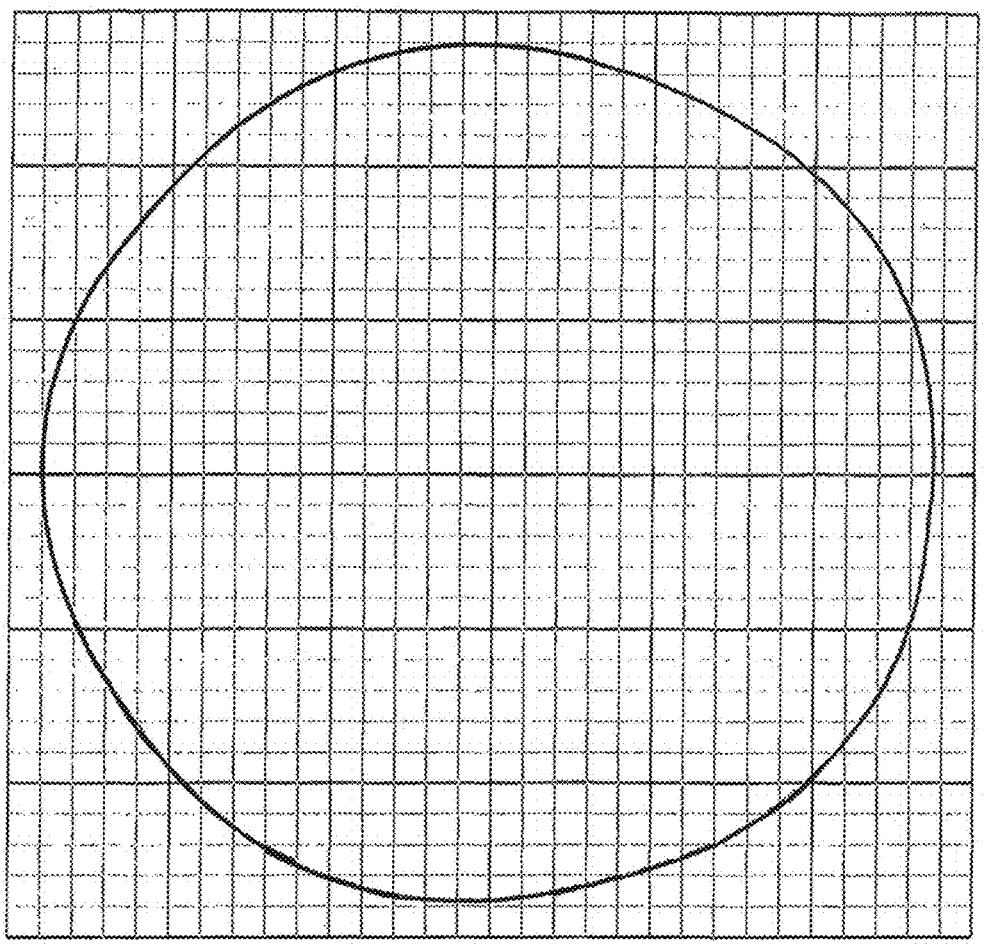
FIG. 5 shows an example of a suitable compensation curve to be used in a PCC according to exemplary embodiments of the present invention.

In order to provide the desired polygon compensation effect, the races formed by the peripheries of the stationary element 39a and the outer ring 39b are provided with a shape which deviates from a perfect circle and forms a compensation curve, as it is exemplary shown in FIG. 5. The construction of the compensation curves forming the races will be described further below with reference to FIG. 11.

Due to the non-circular shape of the races, the radial distance from the center axis line A of the rollers 35 mounted to the axles 36 of the joints between the first and second coupling elements 34a will change, when the first and second rotatable elements 31, 32 are rotated by driving one of the shafts 37, 38 and causing the rollers 35 to roll along one of the races formed by the peripheries of the stationary element 39a and the outer ring 39b. In consequence, the distance in circumferential direction of two protrusions 31a, 32a of the first and second rotatable elements 31, 32 coupled to each other by the coupling elements 34a will fluctuate and a rotation of a (first) driving shaft 37 and the corresponding first rotatable element 31 with constant angular velocity will result in a rotation of the other (second) rotatable element 32 and the corresponding (second) driven shaft 38, which is coupled to said other rotatable element 32, with a non-constant, fluctuating angular velocity. Such construction allows to compensate for the polygon effect by forming the races provided by the peripheries of the stationary element 39a and/or the outer ring 39b according to a suitable compensation curve.

Figure 6A:
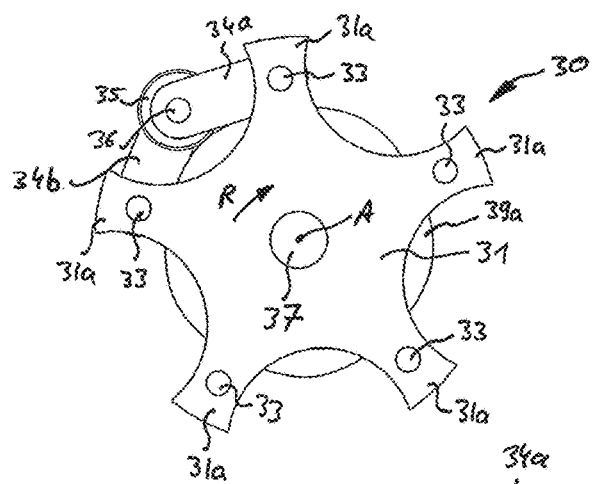
FIGS. 6a to 6c show front-side views of the PCC according to the first embodiment at three different points of time during operation.
Figure 6B:
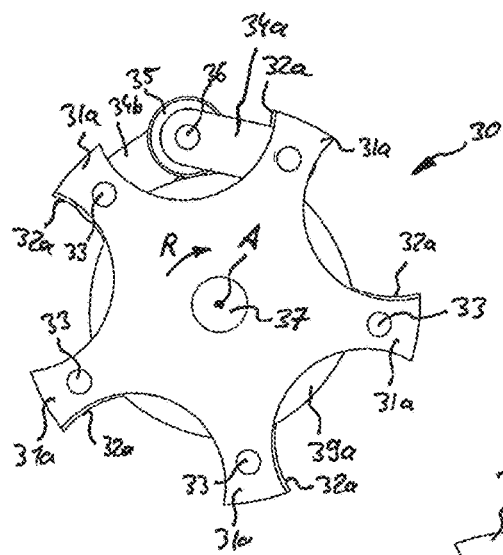
Figure 6C:
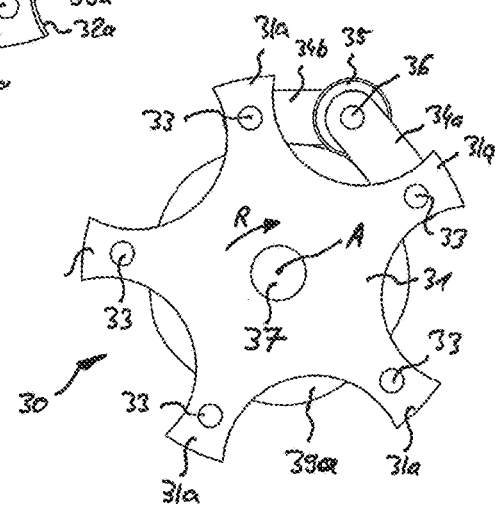

In order to illustrate the functionality of said PCC 30 in even more detail, FIGS. 6a to 6c show front-side views of the PCC 30 shown in FIG. 4 during operation at three different points of time, respectively. In order to visualize the principle of the construction more clearly, the outer ring 39b is not shown in FIGS. 6a to 6c and only one link 34a, 35, 36 connecting the first and second rotatable elements 31, 32 is shown.

In FIG. 6a the first and second rotatable elements 31, 32 are arranged so that the protrusions 32a of the second rotatable element 32 are arranged parallel to the protrusions 31a of the first rotatable element 31 and the protrusions 32a of the second rotatable element 32 are covered by the protrusions 31a of the first rotatable element 31 when viewed in axial direction, as it is shown in FIG. 6a.

In FIG. 6b the first rotatable element 31 shown in front has been rotated in clockwise direction, as indicated by arrow R, which caused the roller 35 to roll along the outer periphery of the stationary element 39a. As said outer periphery is not formed exactly circular, but has a shape similar to the shape shown in FIG. 5, the roller 35 has moved slightly inwards in radial direction, straightening the joint formed by the first and second coupling elements 34a, 34b. This inward movement of the roller 35 has caused a lengthening of the link 34a, 34b, 35, 36 formed by the first and second coupling elements 34a, 34b and the distance in circumferential direction between the protrusion 31a of first rotatable element 31 and the corresponding protrusion 32a of second rotatable element 32 has increased. As a result, in the same time the second rotatable element 32 has been rotated over a smaller angle than the first rotatable element 31, i.e. the second rotatable element 32 has rotated with a smaller angular velocity than the first rotatable element 31.

In FIG. 6c the first rotatable element 31 shown in front has been rotated further in clockwise direction, as indicated by arrow R, which caused the roller 35 to roll further along the outer periphery of the stationary element 39a. Due to the shape of the outer periphery of the stationary element 39a, the roller 35 has moved slightly outwards in radial direction, bending the joint formed by the first and second coupling elements 34a, 34b. This bending has caused a shortening of the link 34a, 34b, 35, 36 formed by the first and second coupling elements 34a, 34b and the distance in circumferential direction between the protrusion 31a of first rotatable element 31 and the corresponding protrusion 32a of second rotatable element 32 is reduced. As a result, in the time interval between FIGS. 6b and 6c, the second rotatable element has been rotated over a larger angle than the first rotatable element 31, i.e. the second rotatable element 32 has rotated with a larger angular velocity than the first rotatable element 31.

In FIG. 6c the protrusions 31a, 32a of the first and second rotatable elements 31, 32 are again arranged parallel to each other, so that the protrusions 32a of the second rotatable elements 32 are covered by the protrusions 31a of the first rotatable elements 31 when viewed in axial direction from the front. I.e. in the time interval between FIGS. 6a and 6c the first and second rotatable elements 31, 32 have been rotated by the same angle and with the same average angular velocity. However, the actual velocity of the second rotatable element 32 has fluctuated during the rotation: The velocity of the second rotatable element 32 was lower in the first time interval from the time the PCC had the configuration shown in FIG. 6a to the time the PCC had the configuration shown in FIG. 6b. The velocity of the second rotatable element 32 was higher in the second time interval that passed between the PCC configurations shown in FIGS. 6b and 6c, respectively.

In case the first shaft 37 and the associated first rotatable element 31 are rotated in the opposite (counter-clockwise) direction, the rollers 35 will run along the outer race provided by the inner periphery of the outer ring 39b, which is not shown in FIGS. 6a to 6c. A similar effect of polygon compensation will occur due to the non-circular shape of said inner periphery of the outer ring 39b.

Figure 7:
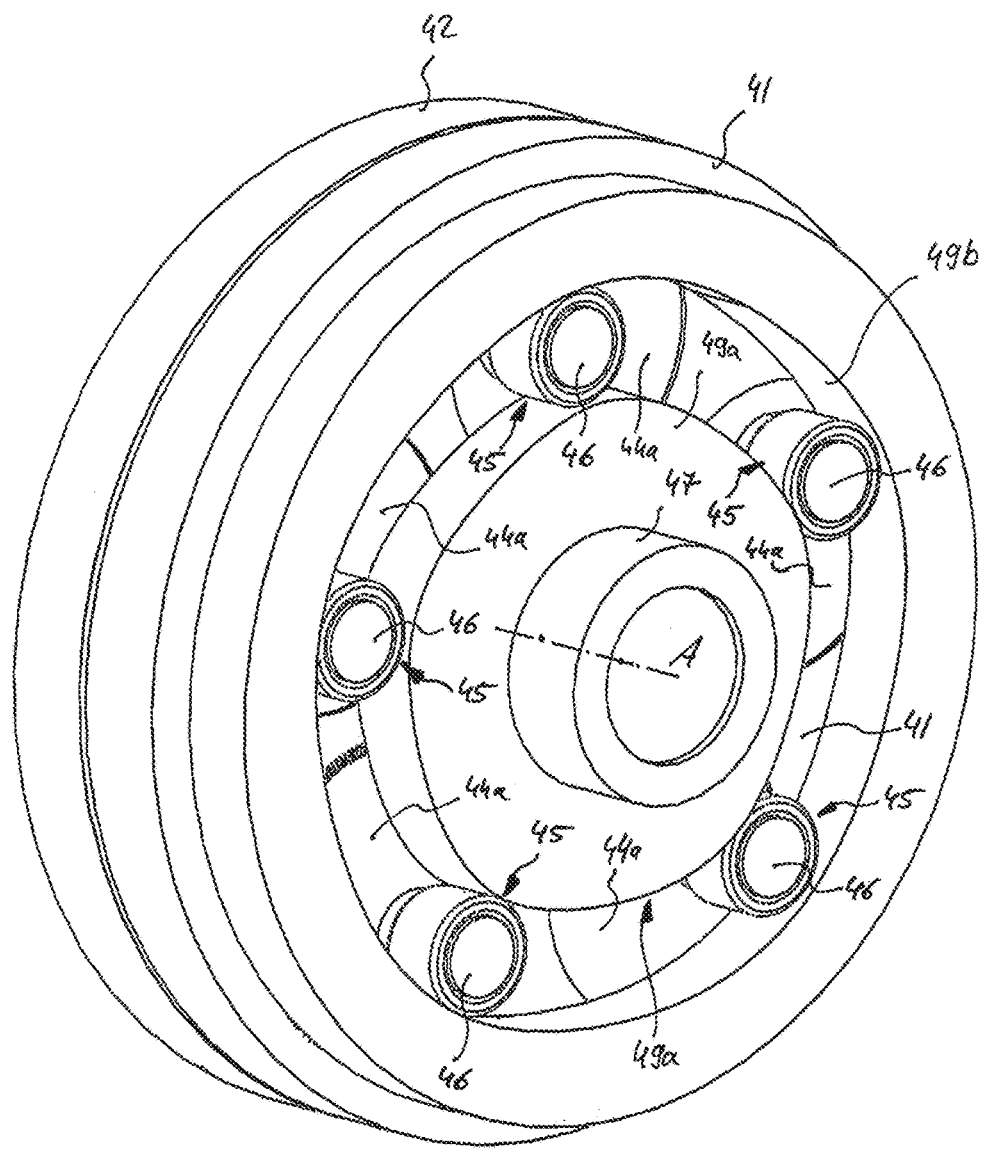
FIG. 7 shows a perspective view of a PCC according to a second exemplary embodiment of the invention.

FIG. 7 shows a perspective view of a polygon compensation coupling system (PCC) 40 according to a second exemplary embodiment of the invention.

In the PCC 40 according to said second embodiment, the first and second rotatable elements 41, 42, which are again rotatably arranged co-axially along a common center axis line A, are formed as disks, respectively. The planes of the disks are oriented parallel to each other and perpendicular to the center axis line A.

A plurality of circular shaped pockets are formed in the plane of the disks of the first and second rotatable elements 41, 42, respectively. The pockets are arranged at positions which are equidistantly separated along the circumferential direction of the rotatable elements 41, 42.

A circular shaped revolving element 44a, 44b is rotatably accommodated in each of said pockets. Each revolving element 44a accommodated in one of the pockets of the first rotatable element 41 is connected by means of an interconnecting axle 46 to a corresponding revolving element 44b (which is not visible in FIG. 7) accommodated in one of the pockets of the second rotatable element 42. The interconnecting axle 46 is arranged eccentrically to each of the revolving elements 44a, 44b and provided with at least one roller 45 arranged between an inner disk shaped stationary element 49a providing an inner race and a stationary outer ring 49b providing an outer race for the rollers 45.

Similarly to the first embodiment, which has been discussed before with reference to FIGS. 4 and 6a to 6c, the radial distance between the stationary element 49a and the outer ring 49b is set to be slightly larger than the diameter of the rollers 45, so that the rollers 45 will be in contact only with either the outer periphery of the stationary element 49a, in case the rotatable elements 41, 42 rotate in a first direction, or with the inner periphery of the outer ring 49b, in case the rotatable elements 41, 42 rotate in a second, opposing direction.

Furthermore, the race defined by the stationary element 49a and the outer ring 49b is not exactly circular but has a shape which is similar to the shape exemplary shown in FIG. 5.

Figure 8A:
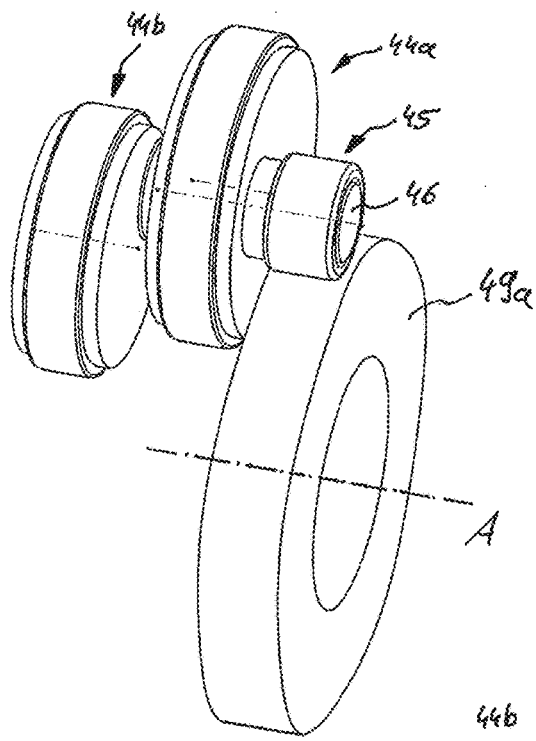
FIG. 8a shows a perspective view of the first and second revolving elements and of the inner disk shaped element of PCC according to a second exemplary embodiment of the invention.
Figure 8B:
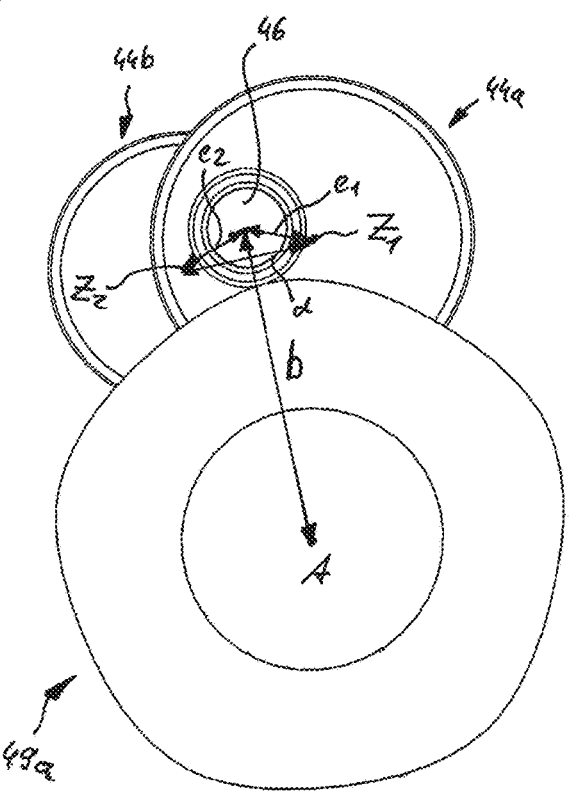
FIG. 8b shows a front-side view of the first and second revolving elements and of the inner disk shaped element of a PCC according to a second exemplary embodiment of the invention.

In order to illustrate the working principle of the PCC 40 according to the second embodiment, FIGS. 8a and 8b show the first and second revolving elements 44a, 44b eccentrically coupled by the interconnecting axle 46, which is provided with a roller 45, and the inner stationary element 49a in a perspective view (FIG. 8a) and in a front view (FIG. 8b). For an easier understanding of the underlying principle, the first and second rotatable elements 41, 42 accommodating the revolving elements 44a, 44b as well as the outer ring 49b are not shown in FIGS. 8a and 8b.

For the following discussion, it is assumed that the first rotatable element 41 (not shown) is driven by an external source, e.g. a motor, providing input rotation, and that the second rotatable element 42 (not shown) delivers the output rotation of the PCC 40.

When the first rotatable element 41 is rotated, the revolving elements 44a arranged in the pockets of the first rotatable element 41 travel circularly around the center axis line A of the PCC 40 and the rollers 45 provided on the interconnecting axles 46 travel along the outer periphery of the disk shaped stationary element 49a. This causes the second revolving elements 44b to travel circularly around the center axis line A of the PCC 40, as well, and rotate the second rotatable element 42 providing the rotational output of the PCC 40. In case the outer periphery of the disk shaped stationary element 49a would be formed exactly circular, the first and second rotatable elements 41, 42 would rotate jointly with the same angular velocity.

However, due to the non-circular shape of said outer periphery, as it is exemplary shown in FIG. 5, the radial distance b from the center axis line A of each of the rollers 45 and its corresponding interconnecting axle 46 will fluctuate causing the revolving elements 44a, 44b to rotate in their respective pockets with respect to the accommodating first and second rotatable elements 41, 42. Since the axle 46 is arranged eccentrically with respect to the center of the circular revolving elements 44a, 44b, said rotation of the revolving elements 44a, 44b varies the distances $e_1$, $e_2$ between the center points $Z_1$, $Z_2$ of the first and second revolving elements 44a, 44b in circumferential direction. I.e. in the same way as in the first embodiment of a PCC 30 (shown in FIGS. 4 and 6a to 6c) the distance d in circumferential direction between the first and second rotatable elements 41, 42 will fluctuate while the rollers 45 roll along the outer periphery of the disk shaped stationary element 49a. In consequence, an input rotation of the first (driving) rotatable element 41 with constant angular velocity is transformed in an output rotation of the second (driven) rotatable element 42 with non-constant angular velocity, in this case into a periodically varying angular velocity.

In operation, the first (input) rotatable element 31, 41 is coupled to a driving motor 52 rotating with constant angular velocity, and the second (output) rotatable element 32, 42 is connected to the step chain drive sprocket 12 of a chain drive 1. By providing an appropriate shape of the circumferential peripheries of the disk shaped stationary elements 39a, 49a and the outer rings 39b, 49b, the polygon effect caused by the step chain drive sprocket 12 is compensated by the non-constant rotation of the step chain drive sprocket 12 provided by the output side of the PCC 30, 40 as it has been described before.

Figure 9A:
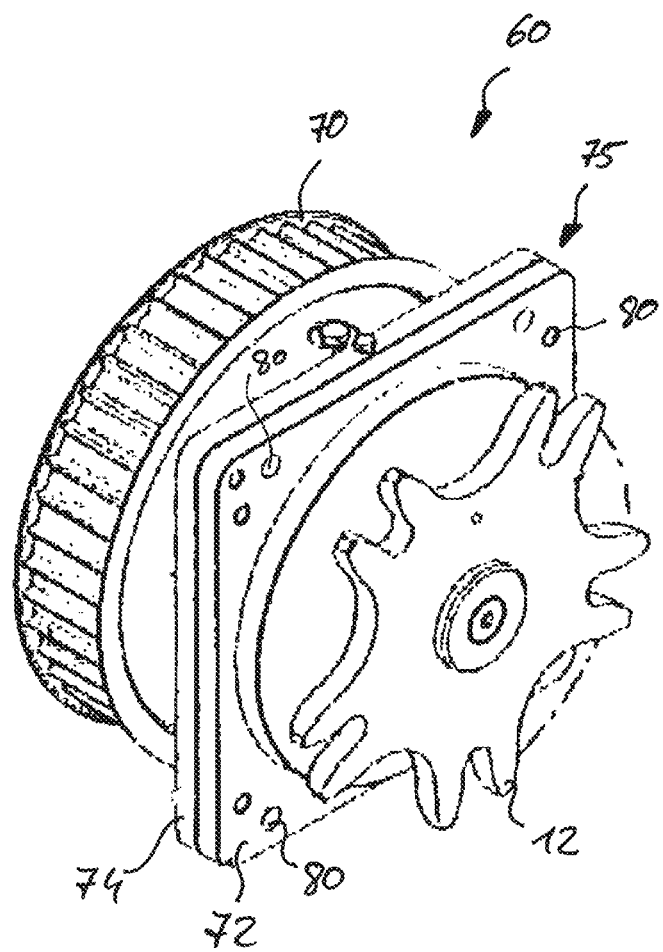
FIGS. 9a to 9c show perspective views of a PCC according to a third embodiment of the invention in the assemble state and in partly assembled states, respectively.
Figure 9B:
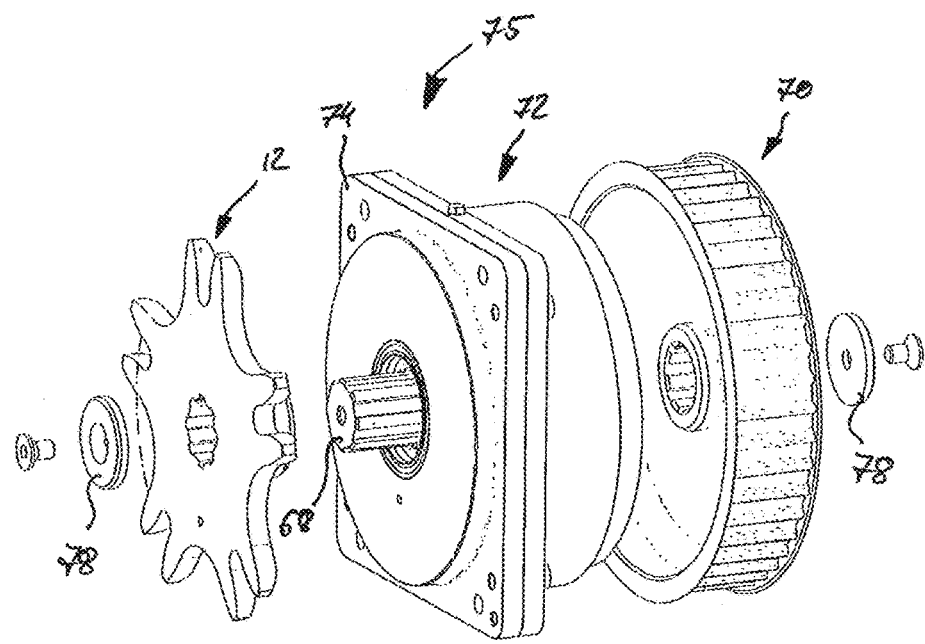
Figure 9C:
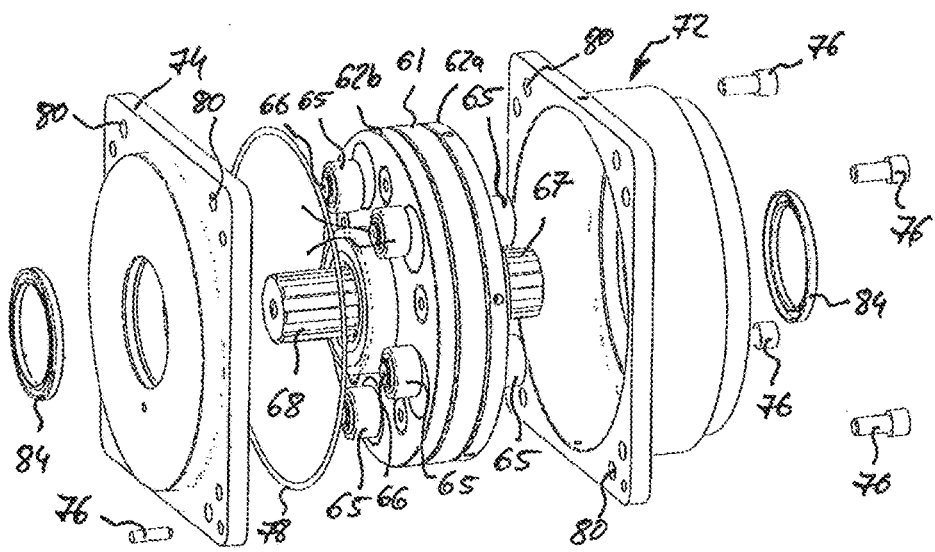

FIGS. 9a to 9c show perspective views of a PCC 60 according to a third embodiment of the invention in an assembled state (FIG. 9a) and in partly assembled states (FIGS. 9b, 9c). FIG. 10a shows a sectional view of said PCC 60 according to the third embodiment and FIG. 10b shows an enlarged portion B of FIG. 10a.

The PCC 60 according to the third embodiment employs the same principle as the PCC 40 according to the second embodiment, which has been discussed before, but comprises two driven rotatable elements 62a, 62b corresponding to the second rotatable element 42 of the second embodiment, the driving (first) rotatable 61 element being sandwiched between said two driven rotatable elements 62a, 62b.

The rotatable elements 61, 62a, 62b and the rollers 65, which correspond to the rollers 45 of the second embodiment, are arranged in a housing 75 comprising two parts 72, 74, the two parts 72, 74 connected to each other in the assembled state by means of bolts 76 which are introduced in corresponding bolt holes 80 provided in the two parts 72, 74 of the housing 75.

A five teeth step chain drive sprocket 12 is mounted to the driven shaft 68, which is connected to the driven rotatable elements 62a, 62b, and a tooth belt wheel 70 is mounted to the driving shaft 67 connected to the driving rotatable element 61.

Two compensation races 72a, 72b, 74a, 74b are formed in each of the two parts 72, 74 of the housing 75. Five rollers 65 are rolling along each of said compensation races 72a, 72b, 74a, 74b. The compensation races 72a, 72b formed in the first part 72 are identical with the compensation races 74a, 74b formed in the second part 74. However, embodiments are possible, in which the compensation races 72a, 72b formed in the first part 72 differ from the compensation races 74a, 74b formed in the second part 74.

The compensation races 72a, 72b 74a, 74b are designed with the radial distance between the inner races 72a, 74a and the outer races 74a, 74b being slightly larger than the diameter of the rollers 65 so that depending on the direction in which the PCC is turning the rollers 65 are in contact with either the inner races 72a, 74a or the outer races 74a, 74b.

The driving shaft 67 forming the motor drive side of the PCC 60 carrying the tooth belt wheel 70 reaches to the middle of the PCC 60 and ends in a centered disc forming the driving rotatable element 61. Five interconnecting axles 66 are mounted in a sliding bushing arrangement formed by revolving elements 64a in the driving rotatable element 61. The rollers 65 are mounted on the relevant eccentric portions on the outermost ends of these interconnecting axles 66.

On the more inner portions of these interconnecting axles 66, driven second and third revolving elements 64b mounted movably. The second and third revolving elements 64b also have eccentric holes provided with sliding bearings. These revolving elements 64b are rotatable mounted in the driven second and third rotatable elements 62a, 62b, which drive the driven shaft 68 carrying and supporting the sprocket 12.

The driving shaft 67 and the driven shaft 68 are arranged coaxially and are supported by the according housing parts 72, 74 by means of roller bearings 84, respectively. In order to enhance the robustness and strength of the PCC 60, the two shafts 67, 68 are coaxially mounted into each other with a sliding bearing 82 provided on their matching inner ends. This structure connects the two shafts 67, 68 axially but keeps them rotatable with respect to each other.

The assembled housing 75 is sealed by means of O-rings 78 and filled with gear oil providing lubrication of the relevant moveable parts.

In a PCC 60 according to the third embodiment almost all the available space is used for functional parts and the only free space is located between the rollers 65 in the compensation groove along the compensation races 72a, 72b 74a, 74b providing a robust and compact PCC 60.

The construction of the compensation curve as it is exemplary shown in FIG. 5 will be explained below with reference to FIGS. 11, 12a and 12b. Such compensation curve may be used in any of the embodiments described herein.

For the following explanation it is assumed that the synchronous input side (first rotatable element) rotates with the constant angular velocity $\omega_A$ and the asynchronous output side (second rotatable element) connected to the chain sprocket 12 rotates with a fluctuating angular velocity $\omega_R(\phi)$.

The compensation curve is to be designed such as to generate a fluctuating angular velocity $\omega_R(\phi)$ that results in the chain 5 traveling along the load/passenger track 7 with constant velocity $v_0$. This specific velocity profile is ensured by the compensation curve in the PCC which provides at every time t (for every angular position $\phi$) the adequate velocity difference $\Delta\omega(\phi)=\omega_R(\phi)-\omega_A$ between the drive shaft 67 on the synchronous input side and the sprocket shaft 68 on the asynchronous output side. Said compensation curve has the same function as a curved compensation track 90 placed in a straight track segment of the chain drive, as it is known in the prior art e.g. from EP 1 479 640 B1 or U.S. Pat. No. 4,498,890.

Figure 11:
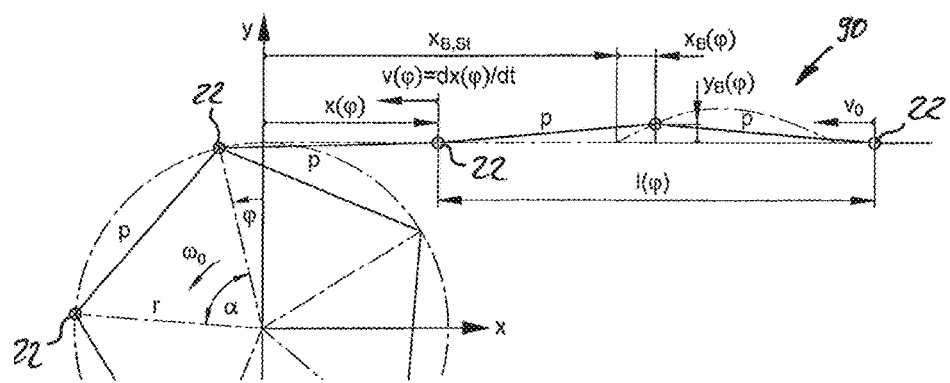
FIG. 11 shows the principal arrangement of the chain and the sprocket as a basis for calculating the compensation curve.

From geometrical considerations, as they are shown in FIG. 11, the position $x(\phi)$ of a chain link 22 and its velocity $v(\phi)=dx(\phi)/dt$ can be determined and an analytic formula of the angular velocity $\omega(\phi)$ under the condition that $v(\phi)=v_0=$const. can be set up.

Figure 12A:
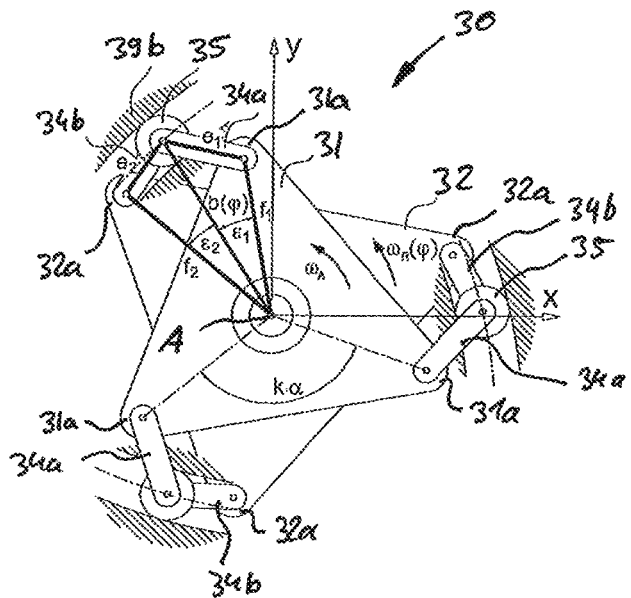
FIG. 12a shows the principal kinematic of a PCC of to the first embodiment.

FIG. 12a shows a simplified model of a PCC 30 according to the first embodiment in which each of the rotatable elements 31, 32 comprises only three protrusions 31a, 32a. The second rotatable element 32 is connected to the step chain sprocket 12 (not shown). The first rotatable element 31 is connected to the motor 52 (not shown) which rotates the first rotatable element 31 with a constant angular velocity $\omega_A$=const.

Turnable eccentrics or links 34a, 34b with respective lengths e1, e2 are mounted to each of the rotatable elements 31, 32. The links 34a, 34b are connected to each other at a roller 35. The rollers 35 travel along a stationary (not moving) compensation curve which is formed by the inner periphery of an outer ring 39b and designed so that the distance $b(\phi)$ from the common center axis A of the rotatable elements 31, 32 fluctuates with the angle of rotation $\phi$ and therefore also the angle between the rotatable elements 31, 32 changes, as it has been described in detail with reference to FIGS. 6a to 6c.

The design of the compensation curve has to ensure that at a certain constant angular velocity $\omega_A$ of the first rotatable element 31 results in the non constant angular velocity angular velocity $\omega(\phi)$ of the second rotatable element 32, as it has been calculated before. This compensation effect reiterates with every tooth of the sprocket 12. Thus, the compensation curve has to consist of n adjacent identical curve segments, with n being the number of teeth of the chain sprocket 12. From this it is obvious that the maximum number of rollers 35, which can travel along the compensation curve, is limited to n and therefore the minimum angular distance between two adjacent rollers 35 is $2\pi/n$.

Figure 12B:
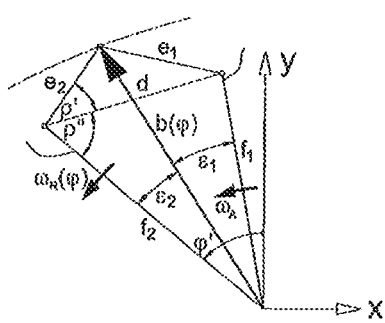
FIG. 12b shows a geometrical scheme of a PCC of to the first embodiment.
Figure 13:
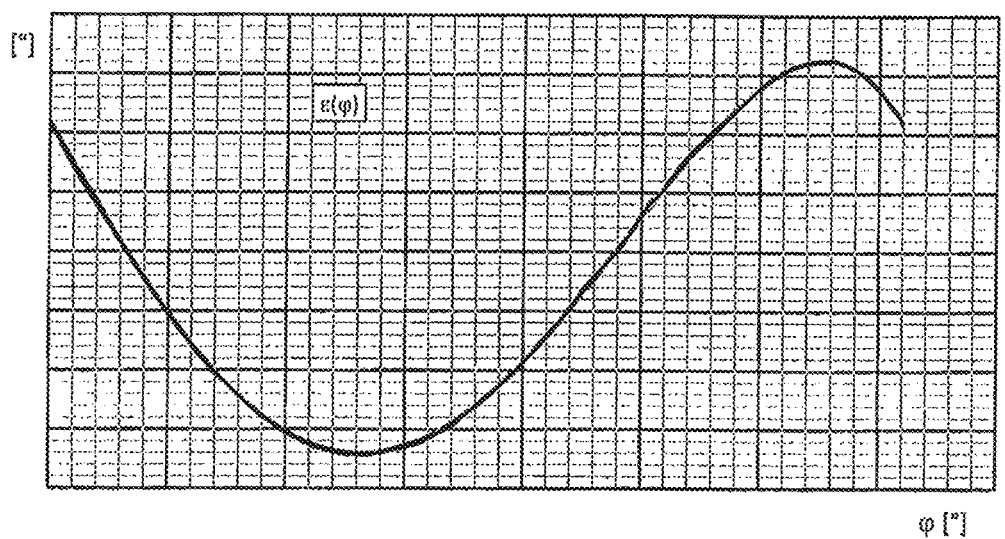
FIG. 13 is a plot showing the course of the angular distance $\epsilon(\varphi)$ between the first and second rotatable element in operation

As it can be seen from FIGS. 12a and 12b, each of the straight lines f1 and f2 encloses with the angles $\epsilon_1$ and $\epsilon_2$ line b connecting the position of the roller 25 with the common center axis A. With $\epsilon = \epsilon_1 - \epsilon_2$ the time rate of change of the angle $d\epsilon/dt$ is the same as the difference of the angular velocities $\Delta\omega = \omega_R - \omega_A$, which allows to find a analytic expression for $\epsilon(\phi)$, a plot of which is shown in FIG. 13. With an analytic expression for $\epsilon(\phi)$ known, it is possible to derive an analytic parametric representation of the PCC compensation curve as it is shown in FIG. 5.

Finally, it is noted, that the PCC 30, 40, 60, as it has been described before, only compensates the polygon effect which is generated by the step chain drive sprocket 12 of the chain drive 1. An additional polygon effect occurs due to the turning of the chain 5 in the second turnaround portion 10 of the chain drive 1 (see FIG. 3). At least one compensation curve, as it is known in the prior art, may be placed in the return track 8 of loop 16, in order to compensate the additional polygon effect cause by the second turnaround portion 10. Using a PCC 30, 40, 60, as it has been described before, however, eliminates the need of using a compensation curve in the load track 7 and thus allows to increase the usable length of the chain drive 1 without increasing its total length. As a result, chain driven systems, in particular chain driven conveyors such as escalators or moving walkways may be built up, which need only little space in addition to the length of transportation. The cost for installing the conveyor may be reduced. This kind of conveyor is in particular beneficial if the available space is restricted.

In a PCC according to the embodiments as they have been described before the number of fluctuating elements is very limited, close to the minimum, and the fluctuating elements are connected in a very short and stiff design. This structure supports a quick changing of the rotating velocity of the system without resulting in high moments of inertia.

Particular embodiments of a polygon compensation system may include any of the following features, alone or in combination, with each other, unless otherwise noted:

In embodiments the compensation curve may be stationary. A stationary compensation curve allows for a stable structure of the PCC and a constant and exact alignment of the compensation curve which provides exact compensation over a long time of operation.

In embodiments, the linkage may comprise at least one roller arranged at the hinge point, the roller being configured to roll along the compensation curve. A roller rolling along the compensation curve reduces the friction and wear resulting from the movement of the hinge point along the compensation curve. It thereby increases the efficiency and the lifetime of the PCC.

In embodiments, at least one of the first and the second coupling elements may comprise a lever pivotably connected to the corresponding rotatable element. Levers connected to the rotatable elements provide reliable coupling elements.

In embodiments, the first and the second coupling element may comprise a lever which is pivotably connected to the corresponding rotatable element. A symmetric structure of the PCC facilitates the assembly of the PCC and reduces the number of different elements needed.

In embodiments, at least one of the first and second rotatable elements may comprise a plurality of radially extending protrusions, at least one of the first and second coupling elements being pivotably coupled to at least one of the protrusions. Radially extending protrusions provide well suited mounting points for the coupling elements and reduce the material used for the rotatable elements. The use of less material reduces the weight and the inertia of the rotatable elements, which facilitates the acceleration and deceleration of the rotatable elements.

In embodiments, at least one of the first and second coupling elements may comprise at least one revolving element eccentrically coupled to the hinge point. Using eccentrically coupled revolving elements as coupling elements allows to increase the maximum torque which may be transferred by the PCC.

In embodiments, at least one of the revolving elements may be rotatably accommodated within the first rotatable element or the second revolving element. Accommodating the revolving element(s) in the rotatable element(s) allows to increase the maximum torque which may be transferred by the PCC as the transfer of torque between the revolving element(s) in the rotatable element(s) is improved.

In embodiments, the first and the second coupling elements both may comprise at least one revolving element eccentrically coupled to the hinge point. A symmetric structure of the PCC facilitates the assembly of the PCC and reduces the number of different elements needed.

In embodiments, a plurality of revolving elements may be coupled to at least one of the rotatable elements. Increasing the number of revolving elements coupled to each of the rotatable elements allows to increase the maximum torque which may be transferred by the PCC, as the transfer of torque is distributed over a plurality of revolving elements.

In embodiments, the axis of rotation of the at least one revolving element may be parallel to the axis of rotation of the respective rotatable element and/or the axis of rotation of the at least one revolving element of the first rotatable element may be arranged parallel to the axis of rotation of the at least one revolving element of the second rotatable element. A parallel arrangement of the axes allows a compact and stable structure of the PCC.

In embodiments, the PCC additionally may comprise at least one third rotatable element and the linkage may comprise a first linkage and a second linkage, the first linkage coupling the first rotatable element with the second rotatable element and the second linkage coupling the first rotatable element with the third rotatable element. Providing an additional rotatable element enhances the load bearing capabilities of the PCC and allows to provide a symmetric and compact structure of the PCC.

Embodiments of the PCC comprising two linkages, further may comprise two compensation curves, one compensation curve assigned to each linkage. Providing a separate compensation curve for each linkage simplifies the structure of the PCC.

The first compensation curve may have the same or a different shape as the second compensation curve. Providing both compensation curves with the same shape facilitates the structure, manufacture and assembly of the PCC. Providing two different compensation curves provides more flexibility for compensation.

In embodiments of the PCC comprising a second and a third rotatable element the first rotatable element may be sandwiched between the second and the third rotatable elements, thus allowing a very compact structure of the PCC.

In this case the second rotatable element and the third rotatable element may be rigidly connected to each other in order to rotate jointly reducing the degrees of freedom in the PCC and providing a very stable structure.

In embodiments, the compensation curve may be formed so that the second rotatable element rotates with non-constant angular velocity when the first rotatable element rotates with constant angular velocity in order to compensate for the polygon effect which occurs when the second rotatable element drives a step chain drive sprocket being part of a chain drive.

In embodiments, the first rotatable element may be connected to at least one drive which is configured to rotate the first rotatable element. The second rotatable element may be connected to at least one sprocket for driving a chain drive providing a chain drive comprising polygon compensation.

The invention claimed is:

1. Polygon compensation coupling system, the system comprising:
   a first rotatable element;
   a second rotatable element;
   at least one linkage coupling the first rotatable element with the second rotatable element, the linkage comprising:
   at least one first coupling element pivotably coupled to the first rotatable element at a position which is radially spaced apart from the axis of rotation of the first rotatable element;
   at least one second coupling element pivotably coupled to the second rotatable element at a position which is radially spaced apart from the axis of rotation of the second rotatable element;
   wherein the first and second coupling elements are pivotably coupled to each other at a hinge point, and
   wherein the hinge point is configured to move along a compensation curve varying the coupling between the first rotatable element and the second rotatable element so that a rotation of the first rotatable element with constant angular velocity results in a rotation of the second rotatable element with a non-constant, fluctuating angular velocity.

2. Polygon compensation coupling system of claim 1, wherein the compensation curve is stationary.

3. Polygon compensation coupling system of claim 2, wherein the linkage comprises at least one roller arranged at the hinge point and configured to roll along the compensation curve.

4. Polygon compensation coupling system of claim 3, wherein at least one of the first and the second coupling elements comprises a lever pivotably connected to the corresponding rotatable element.

5. Polygon compensation coupling system of claim 4, wherein the first and the second coupling elements comprise a lever pivotably connected to the corresponding rotatable element.

6. Polygon compensation coupling system of claim 1, wherein at least one of the first and second rotatable elements comprises a plurality of radially extending protrusions, at least one of the first and second coupling elements pivotable coupled to at least one of the protrusions.

7. Polygon compensation coupling system of claim 3, wherein at least one of the first and second coupling elements comprises at least one revolving element eccentrically coupled to the hinge point.

8. Polygon compensation coupling system of claim 7, wherein at least one of the revolving elements is rotatably accommodated within the first rotatable element or the second rotatable element, respectively.

9. Polygon compensation coupling system of claim 7, wherein the first and the second coupling elements both comprise at least one revolving element eccentrically coupled to the hinge point.

10. Polygon compensation coupling system of claim 9, wherein the revolving elements are rotatably accommodated within the first rotatable element and the second rotatable element, respectively.

11. Polygon compensation coupling system of claim 7, wherein a plurality of revolving elements are coupled to at least one of the rotatable elements.

12. Polygon compensation coupling system of claim 7, wherein the axis of rotation of the at least one revolving element is parallel to the axis of rotation (A) of the respective rotatable element.

13. Polygon compensation coupling system of claim 9, wherein the axis of rotation of the at least one revolving element of the first rotatable element is arranged parallel to the axis of rotation of the at least one revolving element of the second rotatable element.

14. Polygon compensation coupling system of claim 1 additionally comprising at least a third rotatable element and the linkage comprises a first linkage and a second linkage, the first linkage coupling the first rotatable element with the second rotatable element and the second linkage coupling the first rotatable element with the third rotatable element.

15. Polygon compensation coupling system of claim 14, the first linkage comprising a first compensation curve and the second linkage comprising a second compensation curve, the first compensation curve having the same shape as the second compensation curve.

16. Polygon compensation coupling system of claim 14, the first linkage comprising a first compensation curve and the second linkage comprising a second compensation curve, the first compensation curve having a different shape than the second compensation curve.

17. Polygon compensation coupling system of claim 14, wherein the first rotatable element is sandwiched between the second and the third rotatable elements.

18. Polygon compensation coupling system of claim 14 wherein the second rotatable element and the third rotatable element are rigidly connected to each other in order to rotate jointly.

19. Polygon compensation coupling system of claim 1, wherein the compensation curve is formed so that the second rotatable element rotates with non-constant angular velocity when the first rotatable element rotates with constant angular velocity.

20. Polygon compensation coupling system of claim 19 wherein the first rotatable element is connected to at least one drive which is configured to rotate the first rotatable element and the second rotatable element is connected to at least one sprocket for driving a chain drive.

21. Chain drive comprising at least one polygon compensation coupling system according to claim 20.

22. Conveyer comprising at least one chain drive according to claim 21.

23. Polygon compensation coupling system of claim 1, wherein the first rotatable element rotates about a first axis and the at least one coupling element is pivotally coupled to the first rotatable element about a second axis, the second axis different than the first axis.

* * * * *